(12) United States Patent
Feinleib

(10) Patent No.: US 9,489,470 B1
(45) Date of Patent: Nov. 8, 2016

(54) SYSTEM AND METHOD FOR GENERATING CONTENT COMPARISON REPORTS

(71) Applicant: CONTENT ANALYTICS, INC., San Francisco, CA (US)

(72) Inventor: David Feinleib, San Francisco, CA (US)

(73) Assignee: Content Analytics, Inc., San Francisco, CA (US)

( * ) Notice: Subject to any disclaimer, the term of this patent is extended or adjusted under 35 U.S.C. 154(b) by 0 days.

(21) Appl. No.: 14/605,917

(22) Filed: Jan. 26, 2015

(51) Int. Cl.
*G06F 7/00* (2006.01)
*G06F 17/30* (2006.01)

(52) U.S. Cl.
CPC ..... *G06F 17/3089* (2013.01); *G06F 17/30867* (2013.01)

(58) Field of Classification Search
CPC .................. G06F 17/30289; G06F 17/3089; G06Q 30/0243
USPC .................................. 707/728, 748, 999.001
See application file for complete search history.

(56) References Cited

U.S. PATENT DOCUMENTS

| | | | |
|---|---|---|---|
| 6,460,036 B1 | 10/2002 | Herz | |
| 7,395,498 B2 | 7/2008 | Katayama | |
| 7,672,877 B1 * | 3/2010 | Acton | G06F 17/3089 705/26.1 |
| 8,121,970 B1 * | 2/2012 | Tung | G06F 17/30613 706/45 |
| 8,498,990 B2 * | 7/2013 | Heber | 707/748 |
| 2002/0035555 A1 * | 3/2002 | Wheeler et al. | 707/1 |
| 2005/0177401 A1 | 8/2005 | Koeppel | |
| 2005/0262240 A1 | 11/2005 | Drees | |
| 2008/0133500 A1 | 6/2008 | Edwards | |
| 2008/0235096 A1 * | 9/2008 | Owens | 705/14 |
| 2009/0171755 A1 | 7/2009 | Kane | |
| 2009/0172021 A1 | 7/2009 | Kane | |
| 2010/0138452 A1 | 6/2010 | Henkin | |
| 2010/0268809 A1 | 10/2010 | Ganesh | |
| 2012/0270567 A1 | 10/2012 | Johnson | |
| 2015/0046281 A1 * | 2/2015 | Shivaswamy et al. | 705/26.7 |

* cited by examiner

*Primary Examiner* — James Trujillo
*Assistant Examiner* — John J Morris
(74) *Attorney, Agent, or Firm* — Sheppard Mullin Richter & Hampton LLP

(57) ABSTRACT

A system configured to perform content comparison between product web pages, or "product pages", on one or more web sites through which products (e.g., goods, services, and/or other products) are sold is presented. The system may be configured to generate comparison reports and recommendations based on similarity scores. The similarity scores and/or recommendations may reduce instances in which product pages for the same or related products are identified as duplicates by search. The similarity scores and/or recommendations may enhance the content quality, the visibility, and/or relevance of the product pages by keeping them substantially different.

18 Claims, 6 Drawing Sheets

SYSTEM AND METHOD FOR GENERATING CONTENT COMPARISON REPORTS

FIELD

The disclosure relates to a system and method for generating content comparison reports.

BACKGROUND

Content comparison between web pages presenting products to consumers may enhance the quality, visibility, and relevance of the product pages. Content comparison may help product pages overcome indexing barriers imposed by search engines and help prevent the product pages from being identified as duplicates by search engines.

SUMMARY

One aspect of the disclosure relates to a system configured to perform content comparison between product web pages, or "product pages", on one or more web sites through which products (e.g., goods, services, and/or other products) are sold. The system may be configured to generate comparison reports and recommendations based on similarity scores. The similarity scores and/or recommendations may reduce instances in which product pages for the same or related products are identified as duplicates by search. The similarity scores and/or recommendations may enhance the content quality, the visibility, and/or relevance of the product pages by keeping them substantially different. In some implementations, the system may include one or more client computing platforms, one or more product page servers, one or more external resources, one or more content comparison servers, and/or other components, all being communicatively coupled via a network.

In some implementations, the one or more content comparison servers may include one or more physical computer processors configured by machine-readable instructions that may cause the one or more physical computer processors to access product pages on one or more sites via the network. The physical computer processors may be configured to generate content characterization information that characterizes content on individual ones of the product pages. The content characterization information may include first content characterization information that characterizes content on a first product page, and/or second content characterization information that characterizes content on a second product page.

In some implementations, the content characterization information may include characterization information related to one or more of a product name, product description, product-related pictures, product-related videos, product-related media, product reviews, product rating, product stock status, and or any other characterization of content related to one or more products on the product page. In some implementations, the content characterization information may include content characterization information related to the content presentation and/or layout on the product page.

In other implementations, the physical computer processors may be configured to perform content comparison of content present on the individual product pages by comparing content characterization information for different individual product pages. In some implementations, the first content characterization information for the first product page and the second content characterization information for the second product page are compared.

In some implementations, the physical computer processors may be configured to generate a content comparison report including results of the content comparison performed. The content comparison report generated may reflect similarity between sets of product pages such that the content comparison report reflects similarity between the first product page and the second product page.

In some implementations, the sets of product pages may include a first set of product pages. The first set of product pages may include the first product page and the second product page, and performing content comparison of content present on individual ones of the product pages in the first set includes determining a similarity score for the first product page and the second product page that represents how similar the content on the first product page is to the content on the second product page.

In other implementations, the one or more physical computer processors may be configured to obtain a similarity score threshold and to identify the first product page and the second product page as duplicates responsive to the similarity score for the first product page and the second product page reaching the similarity score threshold.

In some implementations, the one or more physical computer processors may be configured to generate recommendations of changes to be made to content included in one or more product pages in a set of product pages to reduce similarity between the content included in the individual ones of the product pages in the set of product pages.

In other implementations, the one or more physical computer processors may be configured to implement the recommendations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
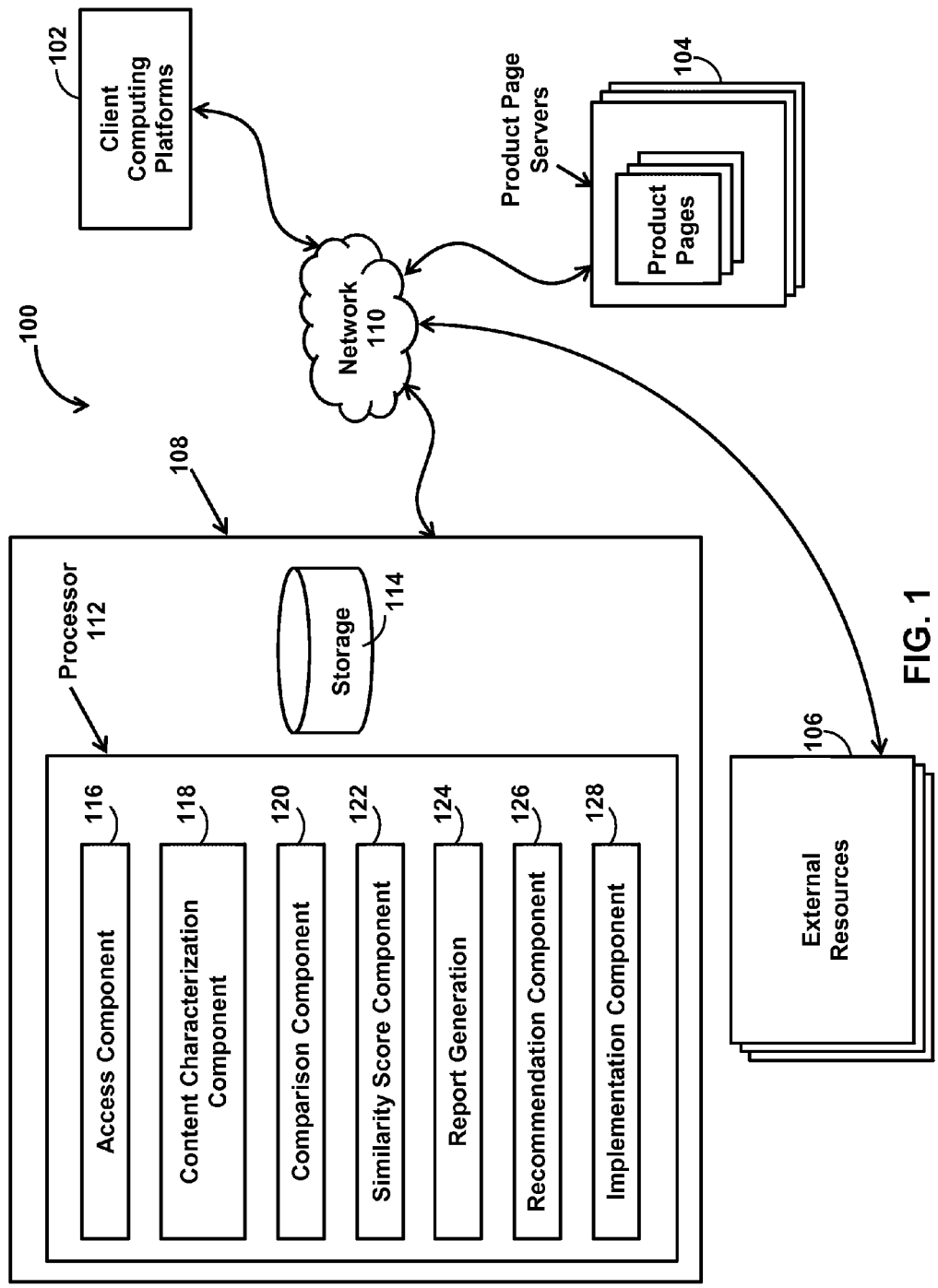
FIG. 1 is a schematic illustration of a system for generating content comparison reports.

FIG. 1 illustrates a system 100 configured to generate content comparison reports. The content comparison may be performed on product web pages, or "product pages," on one or more web sites through which products (e.g., goods, services, and/or other products) are sold. The system 100 may be configured to generate comparison reports and recommendations based on similarity scores. The similarity scores and/or recommendations may reduce instances in which product pages for the same or related products are identified as duplicates by search. The similarity scores and/or recommendations may enhance the content quality, the visibility, and/or relevance of the product pages by keeping them substantially different. In some implementations, as shown in this example, system 100 may include one or more client computing platforms 102, one or more product page servers 104, one or more external resources 106, one or more content comparison servers 108, and/or other components, all being communicatively coupled via a network 110.

The network 110 may include the Internet and/or other networks, Intranets, near field communication, frequency (RF) link, Bluetooth®, Wi-Fi, and/or any type(s) of wired or wireless network(s). It will be appreciated that this is not intended to be limiting and that the scope of this disclosure includes implementations in which the client computing platform(s) 102, the product page server(s) 104, the external resource(s) 106, and/or the content comparison server(s) 108 are operatively linked via some other communication media.

The client computing platform(s) 102 may include one or more processors configured to execute computer program components. The computer program components may be configured to enable one or more users associated with the client computing platform(s) 102 to interface with the system 100, the product page server(s) 104, the external resource(s) 106, the content comparison server(s) 108, and/or provide other functionality attributed herein to client computing platforms 102. By way of non-limiting example, the client computing platform(s) 102 may include desktop computers, laptop computers, handheld computers, Net-Books, tablets, Smartphones, Smartwatches, PDAs, cellular telephones, PC's and/or other computing platforms.

Client computing platform(s) 102 may include one or more physical interfaces. A physical interface included in the client computing platform 102 may be configured to provide an interface between the content comparison server(s) 108 (and/or other components of the system 100) and a user of the client computing platform 102 through which the user may provide information to and/or receive information from the content comparison server(s) 108 (and/or other components of the system 100). This enables data, results, reports, recommendations, and/or instructions and any other communicable items, collectively referred to as "information", to be communicated between the user and the content comparison server(s) 108 (and/or other components of the system 100). Exemplary information provided to and/or received from the content comparison server(s) 108 (and/or other components of the system 100) via a physical interface of the client computing platform 102 may include one or more of information relating to a product page hosted on a product page server, interactions with a user interface and/or other media provided by content comparison server(s) 108, and/or other information. Examples of interface devices suitable for inclusion in a physical interface of the client computing platform 102 include one or more of a keypad, buttons, switches, a keyboard, knobs, levers, a display screen, track pad, a touch screen, speakers, a microphone, an indicator light, an audible alarm, and/or a printer. It is to be understood that other communication techniques, either hardwired or wireless, are also contemplated by the present invention as a physical interface of the client computing platform 102. As such, any technique for communicating information with the content comparison server(s) 108 and/or other components of the system 100 is contemplated by the present disclosure as a physical interface of the client computing platform 102.

The product page server(s) 104 may comprise electronic storage, one or more processors, and/or other components. The electronic storage of the product page server(s) 104 may comprise electronic storage media configured to electronically store information associated with one or more product pages and/or services. The processor(s) of product page server(s) 104 may be configured to provide one or more product pages and/or services. Such product pages and/or services may be provided to a user, for example, via the client computing platform 102. The product page server(s) 104 may include communication lines or ports to enable the exchange of information with a network and/or other computing platforms. Although system 100 may be described in certain sections herein as including product page server(s) 104, this is not intended to be limiting. The product page server(s) 104 may be separate and distinct from the system 100 and may be provided by an entity that is separate from, for example, one or more components of the system 100.

As used herein, "product page" may refer to a web document containing and/or defining content related to a product for sale (or a set of products for sale as a group or package). A product page may be suitable for distribution via the World Wide Web. A product page may be viewable over the network on a client computing platform executing a web browser. A web browser may include a general purpose browser that is usable via the client computing platform to manually navigate the network, a specialized application (e.g., a mobile app, a widget, and/or other specialized applications) that retrieves information over the network and presents the retrieved information via the client computing platform, and/or other applications or programs capable of facilitating the receipt and presentation of web documents. A product page may be stored on one or more local server(s) and/or one or more remote server(s). Access to the server(s) where the product page is hosted may be restricted to private networks, such as Intranets, or may be open to the World Wide Web. A product page may be hosted on a private website, a public website, an e-commerce website, a personal website, a social network website, a community website, a mobile device website, a blog, an informational website, an online business brochure/catalog, a directory website, and/or any other type of hosting websites.

A product page may correspond to an individual product; however, a given product may be offered for sale across multiple different product pages across multiple hosting sites. For example, a product page on amazon.com for a product may be different from a product page for the same product on Walmart.com, which may be different from a product page for the same product on target.com. In other words, the relationship between a product page and a product may be 1 to 1, while the relationship between a product and its product pages may be 1 to many.

As used herein, a "product" may refer to an individual good or service or a set of products being presented as a set, group, or package. A "product" may refer to an entity or a set of entities. An entity may include a natural person, a company, a business entity, a corporate entity, a non-profit entity, and/or other entities. A "product" may refer to a set of information and/or data presented on a product page.

A product page may include static content or product information that is displayed the same for all users from all contexts. A product page may include dynamic content or product information that is adapted or changed on a per user basis so that the dynamic content or product information changes in response to different contexts or conditions. The content related to the product may include product name, product description, product-related pictures, product-related videos, product-related media, product reviews, product ratings, product stock status, and/or any other content related to the product. Some non-limiting examples of product pages may include any good(s) and/or service(s) web pages, personal biography pages, personal profile pages, company biography pages, company profile pages, product brochure pages, informational web pages, real estate listings, and or any other type of product pages.

The external resource(s) 106 may include sources of information, hosts and/or providers of information and/or services outside of the system 100, external entities participating with the system 100 (e.g., cloud storage), and/or other resources. In some implementations, some or all of the functionality attributed herein to the external resources 106 may be provided by resources included in the system 100.

The content comparison server(s) 108 may include electronic storage 114, one or more processors 112, and/or other components. The server 108 may include communication lines or ports to enable the exchange of information with a network and/or client computing platforms. Illustration of server 108 in FIG. 1 is not intended to be limiting. The server 108 may include a plurality of hardware, software, and/or firmware components operating together to provide the functionality attributed herein to the server 108. For example, content comparison server (s) 108 may be implemented by a cloud of computing platforms operating together as server 108.

Electronic storage 114 may comprise electronic storage media that electronically stores information. The electronic storage media of electronic storage 114 may include one or both of system storage that is provided integrally (i.e., substantially non-removable) with server 108 and/or removable storage that is removably connectable to server 108 via, for example, a port (e.g., a USB port, a firewire port, etc.) or a drive (e.g., a disk drive, etc.). Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processors 112, information received from client computing platforms 102, and/or other information that enables content comparison server(s) 108 to function as described herein.

Processor(s) 112 is configured to provide information processing capabilities in server 108. As such, processor(s) 112 may include one or more of a digital processor, an analog processor, a digital circuit designed to process information, an analog circuit designed to process information, a state machine, and/or other mechanisms for electronically processing information. Although processor(s) 112 is shown in FIG. 1 as a single entity, this is for illustrative purposes only. In some implementations, processor 112 may include one or more processing units. The processing units may be physically located within the same device, or processor 112 may represent processing functionality of a plurality of devices operating in coordination.

The processor(s) 112 may be configured to execute one or more computer program components. The one or more computer program components may include one or more of an access component 116, a content characterization component 118, a content comparison component 120, a report generation component 124, a recommendation component 126, an implementation component 128, and/or other components.

Access component 116 may be configured to access product pages on one or more sites via network 110 described above. In some implementations, the access component may be located within the content comparison server(s) 108, within the client computing platform(s) 102, within the product pages server(s) 104, and/or any other location. The product page access component may be configured to serving and/or hosting the product pages, receiving requests for information and/or content, providing the requested information and/or data, provide locations at which the requested information can be accessed, and/or any other configuration allowing access to product pages. In other examples, the access component may be configured to access product pages in response to requests from users, components within or outside system 100, and/or any other requests.

Content characterization component 118 may be configured to generate content characterization information for individual product pages. For example, the content characterization information may characterize content present on an individual product page. The content characterized may include, for example, one or more of the product name, the product's unique identifier, the product part number, the product brand, the product description, the product-related pictures, the product-related videos, the product-related media, the product reviews, the product ratings, the product stock status, content presentation and/or layout on the product page, and/or any other content related to the product on individual product pages. For example, content characterization information may include word count, number of instances of a content type, information related to the product images, information related to the product videos, information related to the product media-related content, information related to the product reviews, and/or any other information. Content characterization information may include information related to the product rating, the stock status, and/or any other value expressed in the content. Content characterization component 118 may be configured to generate content characterization information across multiple product pages.

In some implementations, content characterization component 118 may generate content characterization information that characterizes content on individual ones of the product pages such that the content characterization information includes one or more of first content characterization information that characterizes content on a first product page, second content characterization information that characterizes content on a second product page, and/or other content characterization information that characterizes content on other product pages.

Content comparison component 120 may be configured to perform content comparison of content present on the individual product pages. In some implementations, the content comparison of content present on the individual product pages may be performed by comparing content characterization information for different individual product pages. In some implementations, performing content comparison includes comparing content present on sets of product pages (e.g., pairs of product pages and/or other sets of product pages). The sets of product pages may include one or more of a first set of product pages, a second set of product pages, and/or other sets of product pages.

The first set of product pages may include one or more of the first product page, the second product page, and/or other product pages. In some implementations, the first content characterization information for the first product page and the second content characterization information for the second product page are compared. For example, the comparison of the first content characterization information and the second content characterization information may include one or more of comparison of the content layout on both pages, comparison of information related to the name of the product on both pages, comparison of the images related to the product on both pages, comparison of videos related to the product on both pages, comparison of information related to the media content on both pages, comparison of information related to text on both pages, comparison of information related to the reviews on both pages, and/or any other comparisons of other content characterization information on both the product page and the master page.

In another non-limiting example, content comparison component 120 may be configured to perform comparison of product images on different individual product pages. Comparison of product images may include detecting if a product image on an individual product page is present on any other website. Comparison of product images may include detecting if a product image on an individual product page is present on a different product page related to the same product.

Comparison of product images may be performed by using pixel analysis. A non-limiting example of pixel analysis is counting the number of pixels in individual colors present in a given image (e.g., 720 pixels of color 251, 819 pixels of color 54, etc.). The content comparison component 120 may be configured to compare the pixel counts corresponding to individual colors present on individual product images. Pixel counts corresponding to individual colors present on individual product images may be stored, for easy access and comparison efficiency, in any component within or outside of system 100.

Similarity score component 122 may be configured to determine a similarity score. The similarity score determined by similarity score component 122 may represent the similarity between product pages being compared. For example, similarity score component 122 may determine a similarity score for the first product page and the second product page included in the first set of product pages. The similarity score may represent how similar the content on the first product page is to the content on the second product page. The similarity score may correspond to the number of instances where content on product pages being compared is similar. In some implementations, similarity score component 122 may determine multiple similarity scores for a set of product pages such that the multiple similarity scores correspond to different search engines. For example, if a specific search engine indexes two product pages for an individual product (or related products) and identifies them as duplicates, the search engine may choose one product page to show as a result for a specific query related to the product, and the other one may not be included in the result. The similarity score component 122 and the similarity score may identify the sets of product pages that may be considered duplicates by the specific search engine, which may help avoid the duplicate status by the specific search engine.

In some implementations, similarity score component 122 may be configured to determine multiple similarity scores for an individual product page. The multiple similarity scores may represent content similarities between the content on the individual product page and the content on different product pages. A comprehensive similarity score for the individual product page, indicating how similar the content on the individual product page and the different product pages, may be determined by similarity score component 122.

In some implementations, similarity score component 122 may be configured to predict a similarity score for product pages being compared. For example, similarity score component 122 may predict a similarity score for product pages being compared such that the predicted similarity score may represent similarity between the product pages in the events of changes to individual product pages that may make them similar. By way of non-limiting example, a digital camera is offered for sale on amazon.com and Walmart.com. The stock status value for the digital camera on amazon.com is 20, and the stock status value for the digital camera on Walmart.com is 19. Similarity score component 122 may determine a first similarity score based on the comparison between the current content present on the two product pages for the digital camera and may predict a second similarity score in the event the stock status value on amazon.com changes to 19, and the stock status on Walmart.com remains 19.

In some implementations, similarity score component 122 may be configured to obtain a similarity score threshold. For example, similarity score component 122 may identify the first product page and the second product page as duplicates, responsive to the similarity score for the first product page and the second product page reaching the similarity score threshold. The similarity score threshold may be determined by a user, by similarity score component 122, by websites hosting the product pages, by other components within or outside of system 100, and/or any other similarity score threshold determining mechanism. The similarity score threshold may be aligned with one or more search engines to facilitate identifying sets of product pages that would likely be identified as duplicates by the one or more search engines.

The report generation component 124 may be configured to generate a content comparison report. In some implementations, the content comparison report may include results of the content comparison performed. In some implementations, the content comparison report may reflect analysis of the sets of product pages performed by comparison component 120 and/or similarity score component 122 (e.g., may reflect similarity between the first product page and the second product page).

In some implementations, the report generation component 124 may be configured to generate one or more content comparison reports. Reports generated by the report generation component 124 may include web-based reports, email reports, tables, charts, and/or other types of reports. Reports generated by the report generation component 124 may include individual reports conveying results of content comparison related to a product performed across multiple product pages. For example, reports related to a product may include reports containing comparisons performed across multiple product pages hosted on multiple websites.

The reports generated by the report generation component 124 may include reports generated based on predefined templates. For example, the predefined templates may be obtained and/or generated by the report generation component 124. The predefined templates may include templates corresponding to specific products, templates corresponding to individual hosting sites, templates corresponding to individual users, and/or any other templates. The comparison reports may include customizable reports. Customization of the comparison reports may include customization of the layout of the report, information contained in the report, the structure of the report, and/or any other customization.

In some implementations, the report generation component 124 may be configured to generate reports in response to content comparison being performed. In some implementations, the report generation component 124 may be configured to generate comparison reports in response to one or more requests. The requests to generate comparison reports may include, for example, requests from a user, from a hosting site, from components within or outside system 100, and/or any other requests.

Also shown in FIG. 1 is the recommendation component 126. Recommendation component 126 may be configured to generate one or more recommendations. The recommendations may include recommendations specific to individual product pages in the sets of product pages based on content comparison reports. The recommendations generated by recommendation component 126 may include recommendations of changes to be made to content included in one or more product pages in the set of product pages. In some implementations, the changes recommended may reduce similarity between the content included in the individual ones of the product pages in the set of product pages. In some implementations, recommendation component 126 may generate multiple recommendations specific to different search engines. For example, the recommendation component 126 may generate one or more recommendations for the first product page. The recommendations may reduce the similarity between the content characterization information for the first product page and the content characterization information for the second product page, and/or the content characterization information for other product pages.

In another example, recommendations generated by the recommendation component 126 for a product page may include recommendations of one or more of adding/removing/replacing images on the product page, adding/removing/replacing videos on the product page, modifying the content layout, modifying the media content, modifying stock-related information, modifying name-related information, changing and/or removing duplicate content, and/or any other sets of recommendations.

In some implementations, recommendations component 126 may generate multiple recommendations for individual product pages specific to different search engines. The multiple recommendations corresponding to specific search engines may help prevent the individual product pages from being identified as duplicates by the specific search engines.

The recommendation component 126 may be configured to generate one or more recommendations in response to generation of a comparison report by the report generation component 124. The recommendation component 126 may be configured to generate recommendations in response to requests. For example, requests for recommendations may include requests from a user, from hosting sites, from one or more components within or outside of system 100, and/or any other requests. In some implementations, the requests for recommendations may include stand-alone requests for recommendations for product pages which did not go through the components described above and/or requests for recommendations for product pages which went through one or more of the components described above. For example, a user may request recommendations for a product page which is in the process of being built. The recommendations for a product page being built may include recommendations based on existing product pages for the same product. Such recommendations may reduce content similarity between the product page being built and the existing product pages.

In some implementations, the recommendations generated by the recommendation component 126 may include recommendations that may be presented in the comparison report. In other implementations, the recommendations generated by the recommendation component 126 may be presented separately from the comparison report.

Figure 2:
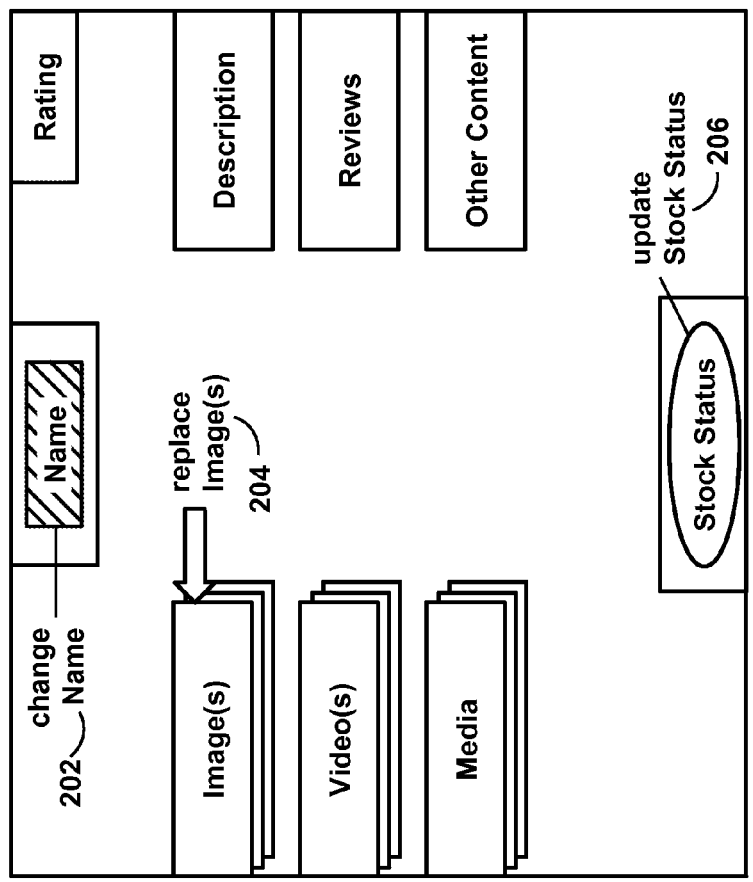
FIG. 2 depicts an example of visual recommendations on a product page.

In some implementations, recommendation component 126 may be configured to generate one or more sets of recommendations including visual recommendations on the product page. Visual recommendations may include text, symbols, numbers, colors, heatmaps, and/or other visual recommendations. A non-limiting example of visual recommendations is shown in FIG. 2. As shown in FIG. 2, the visual recommendations may include a recommendation to change name 202 by highlighting the name, to replace image 204 by pointing an arrow to the image content section, and/or to update stock status 206 by circling the stock status section on the product page.

Implementation component 128 may be configured to implement one or more recommendations. The implementation component 128 may be configured to implement individual recommendations corresponding to individual product pages. The implementation component 128 may be configured to implement recommendations across multiple product pages. The implementation component 128 may be configured to implement recommendations including recommendations generated by the recommendation component 126 described above.

For example, implementation of the one or more recommendations corresponding to a product page may include one or more of adding/removing/replacing images on the product page, adding/removing/replacing videos on the product page, modifying the layout of the product page, modifying the media content on the product page, modifying stock-related information, modifying name-related information, and/or any other implementations of recommendations for the product page.

In some implementations, the implementation component 128 may be configured to obtain modifications requests. The implementation component 128 may be configured to implement modifications requests. In some implementations, requests for modifications may include requests from a user, from a hosting site, from components within or outside system 100, and/or any other requests.

In some implementations, processor(s) 112 may be configured to access the product pages, generate the content characterization information, perform the content comparison, generate the content comparison report, and/or implement the recommendations periodically.

Figure 3:
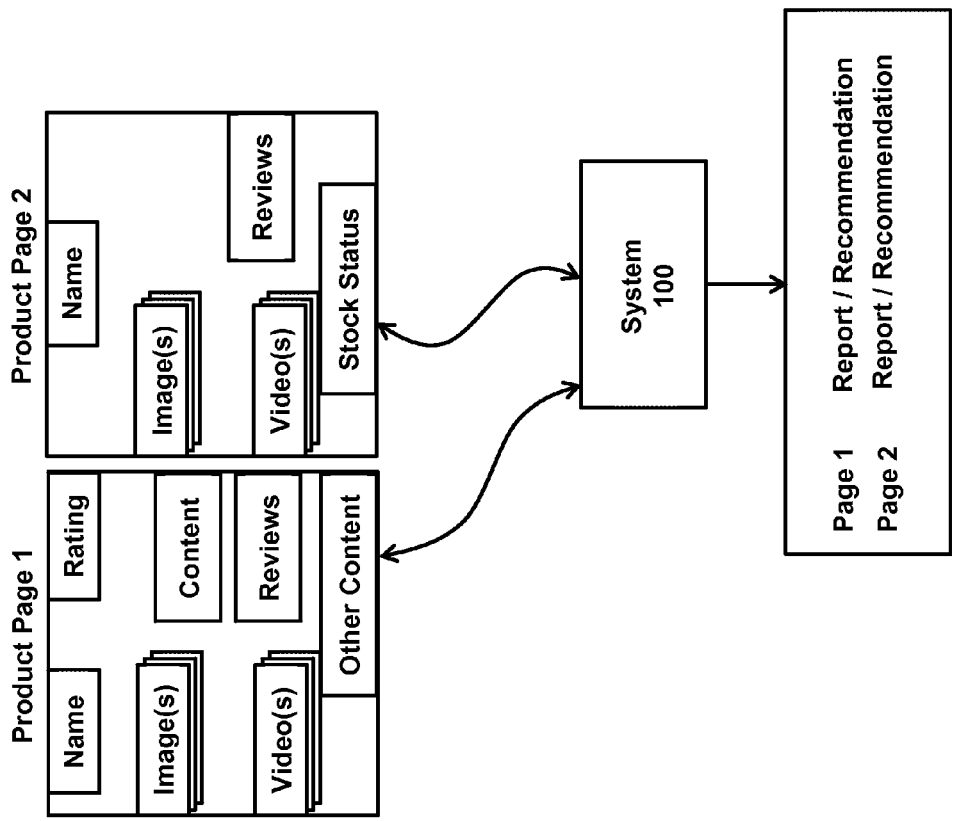
FIG. 3 depicts an example of content comparison between 2 product pages.

FIG. 3 illustrates one implementation, by system 100 shown in FIG. 1, of content comparison related to a product. The example will be described with reference to FIG. 1. As shown in FIG. 3, system 100 may access content related to the product on product page 1 and product page 2 via access component 116 described in FIG. 1. System 100 may generate content characterization information corresponding to product page 1 and product page 2 via content characterization component 118 described in FIG. 1. For example, content characterized on product page 1 and/or product page 2 may include the product name, the product's unique identifier, the product part number, the product brand, the product description, the product-related pictures, the product-related videos, the product-related media, the product reviews, the product ratings, the product stock status, and/or any other content related the product on product page 1 and/or product page 2.

Content characterization on product page 1 and/or product page 2 may include word count, number of instances of a content type, characterization of images, characterization of videos, characterization of media-related content, characterization of the reviews, content presentation and/or layout, and/or any other characterization. In other examples, content characterization may include information related to the product rating, the stock status, and/or any other value expressed in the content of product page 1 and/or product page 2.

System 100 may perform content comparison of content present on product page 1 and product page 2 via comparison component 120 described in FIG. 1. The content comparison performed by system 100 may be based on comparing the content characterization information for product page 1 with the content characterization information for product page 2. The comparison of the content characterization information of product page 1 and product page 2 may include one or more of comparison of the content layout on both pages, comparison of information related to the name of the product on both pages, comparison of images related to the product on both pages, comparison of the videos related to the product on both pages, comparison of information related to the media content on both pages, comparison of information related to text in the content on both pages, comparison of information related to the reviews related to the product on both pages, and/or any other comparisons of other content characterization information on both product page 1 and product page 2.

Also shown in FIG. 3, system 100 may be configured to generate one or more comparison reports, including results of the comparison performed, via report generation component 124 described in FIG. 1 above. The comparison reports may correspond to the comparison of content between product page 1 and product page 2.

System 100, as shown in FIG. 3, may be configured to generate one or more recommendations via recommendation component 116 described in FIG. 1 above. The recommendations may be based on the content comparison reports generated by report generation component 124. The recommendations may include recommendations specific to product page 1 based on corresponding content comparison reports. The recommendations may include recommendations specific to product page 2 based on corresponding content comparison reports. The recommendations generated by recommendation component 126 may include recommendations of changes to be made to content included in product page 1 and/or product page 2. In some implementations, the changes recommended may reduce similarity between the content included in product page 1 and product page 2. For example, recommendations for product page 1 may include one or more of adding/removing/replacing images on the first page, adding/removing/replacing videos on the first page, modifying the content layout of the first page, modifying the media content on the first page, modifying stock-related information, modifying name-related information, and/or any other recommendations.

Still referring to FIG. 3, the recommendations for product page 1 and/or product page 2 may be generated in response to generation of the comparison report by the report generation component 124 or in response to requests from one or more of a user, hosting sites, one or more components within or outside of system 100, and/or any other requests. The recommendations generated by the recommendation component 126 may include recommendations that may be presented in the comparison reports for product page 1 and product page 2.

Figure 4:
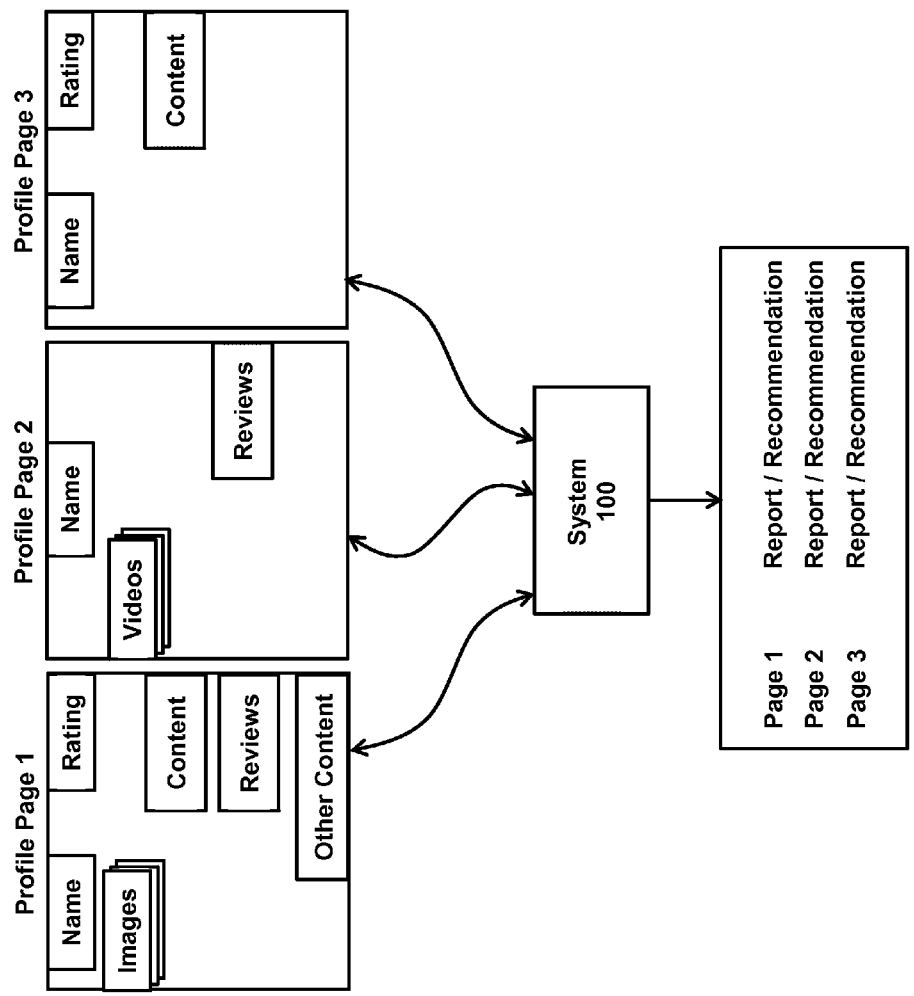
FIG. 4 depicts an example of content comparison between profile pages.

FIG. 4 illustrates an implementation of system 100 described in FIG. 1. As shown in FIG. 4, system 100 may access content related to a person on multiple profile pages via access component 116 described in FIG. 1. A page containing information related to a person will be called a "profile page." It's to be understood that the term "profile page" as used herein may include any page containing any type of information/data related to a person. As shown in FIG. 4, system 100 may access content present on profile page 1 and profile page 2 via access component 116 described in FIG. 1. System 100 may generate content characterization information corresponding to profile page 1 and profile page 2 via content characterization component 118 described in FIG. 1. For example, content characterized on profile page 1 and/or profile page 2 may include the name of the person, images, videos, text, reviews and/or comments, information related to the ratings of the person, and/or any other content characterization on profile page 1 and/or profile page 2.

System 100 may perform content comparison of content present on profile page 1 and profile page 2 via comparison component 120 described in FIG. 1 based on comparing the content characterization information for profile page 1 with the content characterization information for profile page 2. The comparison of the content characterization information of profile page 1 and profile page 2 may include one or more of comparison of the content layout on both pages, comparison of information related to the name of the person on both pages, comparison of images on both pages, comparison of videos on both pages, comparison of information related to the media content on both pages, comparison of information related to the text in the content on both pages, comparison of information related to reviews on both pages, and/or any other comparisons of other content characterization information on both profile page 1 and profile page 2.

Also shown in FIG. 4, system 100 may be configured to generate one or more comparison reports, including results of the comparison performed, via report generation component 124 described in FIG. 1 above. The comparison reports may correspond to comparison between content of product page 1 and product page 2.

System 100, as shown in FIG. 4, may be configured to generate one or more recommendations via recommendation component 126 described in FIG. 1 above. The recommendations may be based on the content comparison reports generated by report generation component 124. The recommendations may include recommendations specific to profile page 1 and/or profile page 2 based on corresponding content comparison reports. The recommendations generated by recommendation component 126 may include recommendations of changes to be made to content included in profile page 1 and/or profile page 2. In some implementations, the changes recommended may reduce similarity between the content included in profile page 1 and profile page 2. For example, recommendations for profile page 1 may include one or more of adding/removing/replacing images, adding/removing/replacing videos, modifying the content layout, modifying the media content, modifying name-related information, and/or any other recommendations for profile page 1.

Still referring to FIG. 4, the recommendations for profile page 1 and/or profile page 2 may be generated in response to generation of the comparison report by the report generation component 124 or in response to requests from one or more of a user, hosting sites, one or more components within or outside of system 100, and/or any other requests. The recommendations generated by the recommendation component 126 may include recommendations that may be presented in the comparison reports for profile page 1 and profile page 2.

Figure 5:
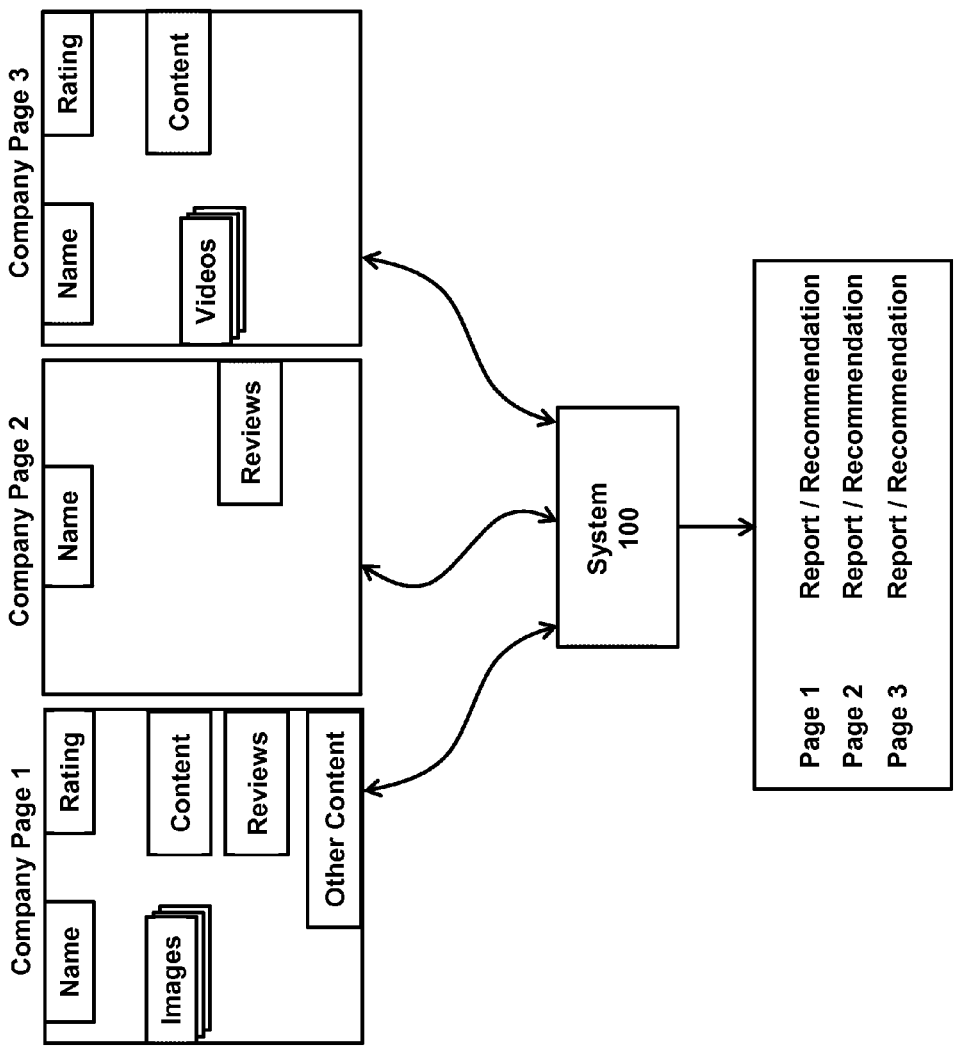
FIG. 5 depicts an example of content comparison between company pages.

As described above, an entity may be a company. FIG. 5 describes an implementation where system 100 may perform content analytics of content of a product page where the product is a company. Some non-limiting examples of product pages containing content related to a company include company profile pages, company biography pages, company listings pages, business catalogues, informational pages, and/or any other pages containing information and/or data related to a company.

FIG. 5 illustrates an implementation of system 100 described in FIG. 1. As shown in FIG. 5, system 100 may access content related to a company on multiple company pages via access component 116 described in FIG. 1. As shown in FIG. 5, system 100 may access content present on company page 1 and company page 2 via access component 116 described in FIG. 1. System 100 may generate content characterization information corresponding to company page 1 and company page 2 via content characterization component 118 described in FIG. 1. For example, content characterized on company page 1 and/or company page 2 may include name of the company, images, videos, text, reviews, information related to the ratings of the company and/or other content on company page 1 and/or company page 2.

System 100 may perform content comparison of content present on company page 1 and company page 2 via comparison component 120 described in FIG. 1, based on comparing the content characterization information for company page 1 with the content characterization information for company page 2. The comparison of the content characterization information of company page 1 and company page 2 may include one or more of comparison of the content layout on both pages, comparison of information related to the name of the company on both pages, comparison of images on both pages, comparison of videos on both pages, comparison of information related to the media content on both pages, comparison of information related to the text in the content on both pages, comparison of information related to the reviews on both pages, and/or any other comparisons of other content characterization information on both company page 1 and company page 2.

Also shown in FIG. 5, system 100 may be configured to generate one or more comparison reports, including results of the comparison performed, via report generation component 124 described in FIG. 1 above. The comparison reports may correspond to comparison between content of company page 1 and company page 2.

System 100, as shown in FIG. 5, may be configured to generate one or more recommendations via recommendation component 126 described in FIG. 1 above. The recommendations may be based on the content comparison reports generated by report generation component 124. The recommendations may include recommendations specific to company page 1 and/or company page 2 based on corresponding content comparison reports. The recommendations generated by recommendation component 126 may include recommendations of changes to be made to content included in company page 1 and/or company page 2. In some implementations, the changes recommended may reduce similarity between the content included in company page 1 and company page 2. For example, recommendations for company page 1 may include one or more of adding/removing/replacing images, adding/removing/replacing videos, modifying the content layout, modifying the media content, modifying name-related information, and/or any other recommendations for company page 1.

Still referring to FIG. 5, the recommendations for company page 1 and/or company page 2 may be generated in response to generation of the comparison report by the report generation component 124 or in response to requests from one or more of a user, hosting sites, one or more components within or outside of system 100, and/or any other requests. The recommendations generated by the recommendation component 126 may include recommendations that may be presented in the comparison reports for company page 1 and company page 2.

System 100 may be configured to implement the recommendations corresponding to individual company profile pages generated by recommendation component 126. The one or more recommendations may be implemented via implementation component 128 described in FIG. 1 above. For example, implementation of the one or more sets of recommendations corresponding to the first company page may include one or more of adding/removing/replacing images on the first company page, adding/removing/replacing videos, modifying the content layout of the first company page, modifying the media content on the first company page, modifying name-related information, and/or any other implementations of recommendations for the first company page.

Processor(s) 112 may be configured to execute components 116, 118, 120, 122, 124, 126, and/or, 128, by software, hardware, firmware, some combination of software, hardware, and/or firmware, and/or other mechanisms for configuring processing capabilities on the processor(s) 112. It should be appreciated that, although components 116, 118, 120, 122, 124, 126, and 128 are illustrated in FIG. 1 as being co-located within a single processing unit, in implementations in which processor 112 includes multiple processing units, one or more of components 116, 118, 120, 122, 124, 126, and/or 128 may be located remotely from the other components. The description of the functionality provided by the different components 116, 118, 120, 122, 124, 126, and 128 described below is for illustrative purposes and is not intended to be limiting, as any of components 116, 118, 120, 122, 124, 126, and/or 128 may provide more or less functionality than is described. For example, one or more of components 116, 118, 120, 122, 124, 126, and/or 128 may be eliminated, and some or all of its functionality may be provided by other ones of components 116, 118, 120, 122, 124, 126, 128, and/or other components. As another example, processor 112 may be configured to execute one or more additional components that may perform some or all of the functionality attributed below to one of components 116, 118, 120, 122, 124, 126, and/or 128.

Figure 6:
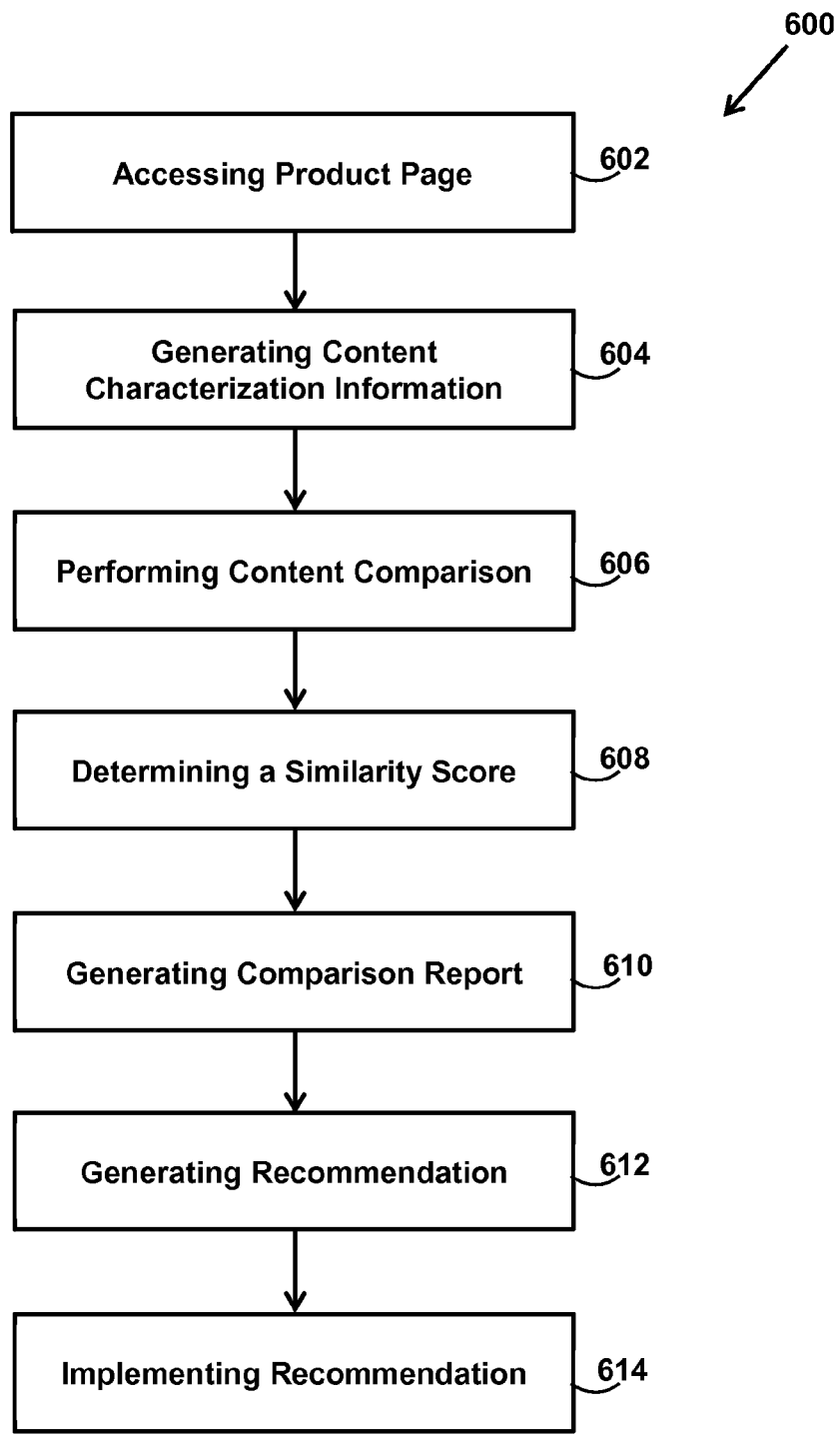
FIG. 6 depicts an example of a method for generating content comparison reports.

FIG. 6 illustrates a method 600 for generating content comparison reports implemented in a computer system. The operations of method 600 presented below are intended to be illustrative. In some implementations, method 600 may be accomplished with one or more additional operations not described and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

Referring to FIG. 6, at an operation 602 of method 600, product pages may be accessed on one or more sites. In some implementations, product pages may be accessed via a network. In some implementations, operation 602 may be performed by an access component the same as or similar to access component 116 (shown in FIG. 1 and described herein).

At an operation 604, content characterization information that characterizes content on individual product pages may be generated. The content characterization information may include first content characterization information that characterizes content on a first product page. In some implementations, the content characterization information may include second content characterization information that characterizes content on a second product page and/or other content characterization information that characterizes content on other product pages. The first content characterization information may characterize one or more of a product name, product description, product-related pictures, product-related videos, product-related media, product reviews, product ratings, product stock status, content presentation, content layout, and/or any other characterization of content related to one or more products on the first product page. In some implementations, operation 604 may be performed by a content characterization component the same as or similar to content characterization component 118 (shown in FIG. 1 and described herein).

At an operation 606, content comparison of content present on the individual product pages is performed. In some implementations, content comparison of content present on the individual product pages is performed by comparing content characterization information for different individual product pages. In some implementations, the first content characterization information for the first product page and the second content characterization information for the second product page are compared. In some implementations, performing content comparison includes comparing content present on sets of product pages. The sets of product pages may include one or more of a first set of product pages, a second set of product pages, and/or other sets of product pages. The first set of product pages may include one or more of the first product page, the second product page, and/or other product pages. In some implementations, operation 606 may be performed by a content comparison component the same as or similar to comparison component 120 (shown in FIG. 1 and described herein).

At an operation 608, a similarity score is determined. In some implementations, a similarity score for the first product page and the second product page is determined. In some implementations, the similarity score for the first product page and the second product page may represent how similar the content on the first product page is to the content on the second product page. In some implementations, operation 608 comprises obtaining a similarity score threshold. In some implementations, the first product page and the second product page may be identified as duplicates responsive to the similarity score for the first product page and the second product page reaching the similarity score threshold. In some implementations, operation 608 may be performed by a similarity score component the same as or similar to similarity component 122 (shown in FIG. 1 and described herein).

At an operation 610, a comparison report including results of the content comparison performed is generated. In some implementations, the content comparison report reflects similarity between the sets of product pages such that the content comparison report reflects similarity between the first product page and the second product page. In some implementations, the content comparison report generated may be based on comparison of content present on individual product pages wherein the individual product pages are for the same product. In some implementations, operation 610 may be performed by a report generation component the same as or similar to report generation component 124 (shown in FIG. 1 and described herein).

At an operation 612, recommendations are generated. In some implementations, the recommendations generated are based on the comparison report. In some implementations, the recommendations may include recommendations of changes to be made to content included in one or more product pages in a set of product pages. In some implementations, the changes to content included in one or more product pages in a set of product pages may reduce similarity between the content included in the individual ones of the product pages in the set of product pages. In some implementations, generating the recommendations includes generating visual representations of the recommendations. In some implementations, operation 612 may be performed by a recommendation component the same as or similar to recommendation component 126 (shown in FIG. 1 and described herein).

At an operation 614, the recommendations generated by the recommendation component 126 may be implemented. In some implementations, operation 614 may be performed by an implementation component the same as or similar to implementation component 128 (shown in FIG. 1 and described herein).

In some implementations, one or more of operations 602, 604, 606, 608, 610, 612, and/or 614 may be performed periodically.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate content comparison reports, the system comprising:
   one or more physical computer processors configured by machine-readable instructions that cause the one or more physical computer processors to:
   access product pages through which products are offered for sale on one or more sites via a network, the product pages including:
   a first product page through which a product is offered for sale on a first site, and a second product page through which the product is offered for sale on a second site;

determine similarity of content between product pages for the same or related products, such that a similarity of content is determined between the first product page and second product page;

generate content comparison reports including results of the determination of similarity between product pages for the same or related products, such that a first content comparison report is generated that reflects the determined similarity of content between the first product page and the second product page;

generate recommendations of changes to be made to content included in one or more product pages in a set of product pages to reduce similarity between the content included in individual ones of the product pages in the set of product pages such that implementation of the recommendations will cause the reduction in similarity between the product pages, the reduction in similarity being indicated by a subsequent determination of similarity of content between the product pages, the recommendations including a first recommendation of changes to be made to content in the first product page that will cause the similarity between the content in first product page and the content in the second product page to be reduced, the reduction in similarity between the first product page and the second product page being indicated by a subsequent determination of similarity of content between the first product page and second product page.

2. The system of claim 1, wherein determining similarity of content present on individual ones of the product pages for the same or related products includes determining a similarity score for the product pages that represents how similar content is between the individual product pages, such that determining similarity of content between the first product page and second product page includes determining a first similarity score for the first product page and the second product page, the first similarity score representing how similar the content on the first product page is to the content on the second product page.

3. The system of claim 2 wherein the one or more physical computer processors are further configured to obtain a first similarity score threshold and to identify the first product page and the second product page as duplicates responsive to the first similarity score for the first product page and the second product page reaching the first similarity score threshold.

4. The system of claim 1 wherein the similarity determination is based on one or more of a product name, product description, product-related pictures, product-related videos, product-related media, product reviews, product ratings, product stock status, content presentation, content layout, and/or any other characterization of content on the first product page.

5. The system of claim 1 wherein the generation of the recommendations includes generating visual representations of the recommendations.

6. The system of claim 1 wherein the one or more physical computer processors are further configured to implement the recommendations.

7. The system of claim 1 wherein the one or more physical computer processors are further configured to access the product pages, determine similarity of content between product pages, and generate the content comparison report periodically.

8. The system of claim 1 wherein the similarity determination is based on comparison of a characterization of content present on individual product pages wherein the individual product pages are for the same product.

9. The system of claim 1, wherein the one or more physical processors are further configured by machine-readable instructions to:

generating content characterization information that characterizes content on individual ones of the product pages, the content characterization information including first content characterization information that characterizes content on the first product page and/or second content characterization information that characterizes content on the second product page;

performing content comparison of content present on the individual product pages by comparing content characterization information for different individual product pages such that the first content characterization information for the first product page and the second content characterization information for the second product page are compared; and generate the content comparison reports by further including results of the content comparison performed.

10. A method for generating content comparison reports, the method being implemented in a computer system including one or more physical processors and storage media storing machine-readable instructions, the method comprising:

accessing product pages through which products are offered for sale on one or more sites via a network, the product pages including:

a first product page through which a product is offered for sale on a first site, and a second product page through which the product is offered for sale on a second site;

determine similarity of content between product pages for the same or related products, such that a similarity of content is determined between the first product page and second product page;

generating content comparison reports including results of the determination of similarity between product pages for the same or related products, such that a first content comparison report is generated that reflects the determined similarity of content between the first product page and the second product page generating recommendations of changes to be made to content included in one or more product pages in a set of product pages to reduce similarity between the content included in individual ones of the product pages in the set of product pages such that implementation of the recommendations will cause the reduction in similarity between the product pages, the reduction in similarity being indicated by a subsequent determination of similarity of content between the product pages, the recommendations including a first recommendation of changes to be made to content in the first product page that will cause the similarity between the content in first product page and the content in the second product page to be reduced, the reduction in similarity between the first product page and the second product page being indicated by a subsequent determination of similarity of content between the first product page and second product page.

11. The method of claim 10 wherein determining similarity of content present on individual ones of the product pages for the same or related products includes determining a similarity score for the product pages that represents how similar content is between the individual product pages, such that determining similar of content between the first product page and second product page includes determining a first similarity score for first product page and the second product page, the first similarity score representing how similar the content on the first product page is to the content on the second product page.

12. The method of claim 11 further comprising obtaining a first similarity score threshold and identifying the first product page and the second product page as duplicates responsive to the first similarity score for the first product page and the second product page reaching the first similarity score threshold.

13. The method of claim 10 wherein the similarity determination is based on one or more of a product name, product description, product-related pictures, product-related videos, product-related media, product reviews, product ratings, product stock status, content presentation, content layout, and/or any other characterization of content on the first product page.

14. The method of claim 10 wherein generating the recommendations includes generating visual representations of the recommendations.

15. The method of claim 10 wherein the recommendations are implemented.

16. The method of claim 10 wherein accessing the product pages, determining similarity of content between product pages, and generating the content comparison report are performed periodically.

17. The method of claim 10 wherein the similarity determination is based on comparison of a characterization of content present on individual product pages, wherein the individual product pages are for the same product.

18. The method of claim 10, further comprising:
generating content characterization information that characterizes content on individual ones of the product pages, including generating first content characterization information that characterizes content on the first product page and/or second content characterization information that characterizes content on the second product page;
perform content comparison of content present on the individual product pages by comparing content characterization information for different individual product pages, such that the first content characterization information for the first product page and the second content characterization information for the second product page are compared; and
generating the content comparison reports by further including results of the content comparison performed.

* * * * *